US010986608B2

(12) United States Patent
Hamada et al.

(10) Patent No.: US 10,986,608 B2
(45) Date of Patent: Apr. 20, 2021

(54) COMMUNICATION APPARATUS THAT USES PLURALITY OF COMMUNICATION METHODS, METHOD FOR CONTROLLING THE SAME, AND STORAGE MEDIUM (71) Applicant: CANON KABUSHIKI KAISHA, Tokyo (JP)

(72) Inventors: Yasuhiro Hamada, Kawasaki (JP); Daisuke Kamiwano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/748,131

(22) Filed: Jan. 21, 2020

(65) Prior Publication Data
US 2020/0163045 A1    May 21, 2020

Related U.S. Application Data (63) Continuation of application No. PCT/JP2018/021201, filed on Jun. 1, 2018.

(30) Foreign Application Priority Data

Jul. 21, 2017   (JP) .............................. JP2017-142000

(51) Int. Cl.
*H04W 64/00*   (2009.01)
*G01S 1/08*    (2006.01)
(Continued)

(52) U.S. Cl.
CPC ............. *H04W 64/006* (2013.01); *G01S 1/08* (2013.01); *H04M 1/72412* (2021.01);
(Continued)

(58) Field of Classification Search
CPC ... H04W 64/006; H04W 76/14; H04W 4/023; H04W 36/0016; H04W 36/08; H04W 88/08; G01S 1/08; H04M 1/7253
(Continued)

(56) References Cited

U.S. PATENT DOCUMENTS 7,107,012 B2   9/2006 Kashiwagi et al.
8,301,124 B2   10/2012 Soma et al.
(Continued)

FOREIGN PATENT DOCUMENTS

JP    2004-282643 A    10/2004
JP    2009207069 A     9/2009
(Continued)

OTHER PUBLICATIONS

International Search Report and Written Opinion issued in parent International Application No. PCT/JP2018/021201, dated Aug. 14, 2018.

*Primary Examiner* — Lee Nguyen
(74) *Attorney, Agent, or Firm* — Venable LLP (57) ABSTRACT

A communication apparatus comprises a memory storing instructions which cause to function as: a first communication unit configured to communicate with an external apparatus using a first communication method in which directionality of radio waves is variable; a second communication unit configured to communicate with the external apparatus using a second communication method in which directionality of radio waves is variable; and a control unit configured to control the first communication unit and the second communication unit so as to, after communication using the first communication method has been established, switch communication with the external apparatus to communication using the second communication method, wherein the control unit controls directionality of second radio waves in the second communication method, using information regarding directionality of first radio waves used in the first communication method.

15 Claims, 9 Drawing Sheets (51) Int. Cl.
*H04W 76/14* (2018.01)
*H04W 4/02* (2018.01)
*H04W 36/00* (2009.01)
*H04W 36/08* (2009.01)
*H04W 88/08* (2009.01)
*H04M 1/72412* (2021.01)

(52) U.S. Cl.
CPC ....... *H04W 4/023* (2013.01); *H04W 36/0016* (2013.01); *H04W 36/08* (2013.01); *H04W 76/14* (2018.02); *H04W 88/08* (2013.01)

(58) Field of Classification Search
USPC ............................... 455/127.4, 552.1, 553.1
See application file for complete search history.

(56) References Cited

U.S. PATENT DOCUMENTS

| | | | |
|---|---|---|---|
| 10,021,646 B2 | 7/2018 | Takahashi et al. | |
| 2004/0130487 A1* | 7/2004 | Hoffmann | H01Q 1/2291 |
| | | | 342/359 |
| 2013/0169481 A1 | 7/2013 | Takatsuka et al. | |
| 2013/0229687 A1* | 9/2013 | Yamauchi | G06F 3/1204 |
| | | | 358/1.15 |
| 2014/0342663 A1* | 11/2014 | Eaton | H04M 1/04 |
| | | | 455/41.1 |

FOREIGN PATENT DOCUMENTS

| | | |
|---|---|---|
| JP | 2014-075619 A | 4/2014 |
| JP | 2015180043 A | 10/2015 |
| WO | 2012086472 A1 | 6/2012 |

\* cited by examiner

COMMUNICATION APPARATUS THAT USES PLURALITY OF COMMUNICATION METHODS, METHOD FOR CONTROLLING THE SAME, AND STORAGE MEDIUM

CROSS-REFERENCE TO RELATED APPLICATIONS

This application is a Continuation of International Patent Application No. PCT/JP2018/021201, filed Jun. 1, 2018, which claims the benefit of Japanese Patent Application No. 2017-142000, filed Jul. 21, 2017, both of which are hereby incorporated by reference herein in their entirety.

BACKGROUND OF THE INVENTION

Field of the Invention

The present invention relates to a communication apparatus that uses a plurality of communication methods, a method for controlling the same, and a storage medium.

Background Art

Conventionally, handover techniques are known in which apparatuses capable of communicating with each other using a plurality of communication methods first establish first communication, communicate information required for second communication, and then establish second communication suitable for communicating desired data (Patent Literature 1). Patent Literature 1 discloses a technique for communicating, using near-field wireless communication, parameters for establishing wireless communication after handover and information regarding an executable application, and then establishing communication using Bluetooth (registered trademark) or a wireless LAN to transmit and receive images or the like.

CITATION LIST

Patent Literature

PTL 1: Japanese Patent Laid-Open No. 2009-207069

Patent Literature 1 discloses a technique for performing handover between two wireless communication methods with extremely different communicable distance, but it is also conceivable that handover is performed between two wireless communication methods in which communication can be performed in a range of several meters. For example, after communication using Bluetooth (registered trademark) (also referred to simply as BT communication) has been established, handover can be performed to wireless LAN communication.

Meanwhile, BeamForming techniques for causing radio waves to have directionality to a predetermined direction are known. If BT communication and wireless LAN communication separately employ the BeamForming technique, and the direction to which the directionality is enhanced is independently controlled, when the aforementioned handover is performed, there may be cases where communication apparatuses cannot perform efficient communication after the handover. Specifically, there may be cases where, even though the communication apparatuses are located in an area with high transmission power during BT communication, the communication apparatuses are no longer located in an area with high transmission power in the wireless LAN, depending on the directionality of the wireless LAN after the handover.

SUMMARY OF THE INVENTION

The present invention has been made in view of the foregoing problem, and aims to realizes a technology with which degradation in communication quality after handover can be suppressed in the case where handover is performed using a plurality of communication methods capable of causing radio waves to have directionality.

To solve the foregoing problem, for example, a communication apparatus comprises: one or more processors; and a memory storing instructions which, when the instructions are executed by the one or more processors, cause the communication apparatus to function as: a first communication unit configured to communicate with an external apparatus using a first communication method in which directionality of radio waves is variable; a second communication unit configured to communicate with the external apparatus using a second communication method in which directionality of radio waves is variable, the second communication method being different from the first communication method; and a control unit configured to control the first communication unit and the second communication unit so as to, after communication using the first communication method has been established, switch communication with the external apparatus to communication using the second communication method, wherein, in a case of switching the communication with the external apparatus to the communication using the second communication method, the control unit controls directionality of second radio waves in the second communication method, using information regarding directionality of first radio waves used in the first communication method.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Embodiment 1

Hereinafter, exemplary embodiments of the present invention will be described in detail with reference to the drawings. Note that the following description will describe an example in which, as examples of communication apparatuses, a digital camera and an access point are used, both of which can perform handover using a plurality of communication methods. However, the communication apparatuses according to this embodiment are not limited to a digital camera and an access point, and the present invention is also applicable to other devices that can perform handover using a plurality of communication methods. These devices may include, for example, a mobile phone, including a smartphone, a game machine, a tablet terminal, a wearable terminal of a watch type or a glasses type, a home terminal with audio assistance, a medical device, a device for an in-vehicle system, and the like.

Figure 1:
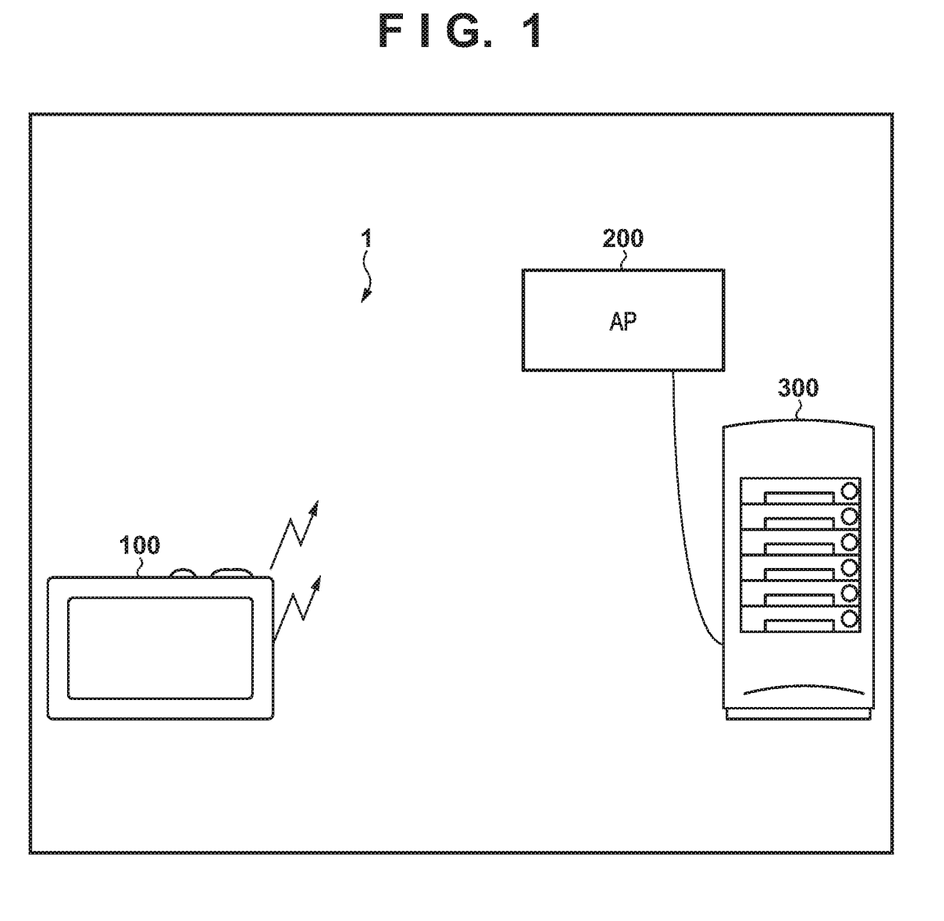
FIG. 1 schematically shows a configuration of a communication system according to Embodiment 1.

The following description will take a communication system 1 shown in FIG. 1 as an example. The communication system 1 includes a digital camera body 100, an access point (also referred to simply as an AP) 200, and an external storage apparatus 300. The digital camera body 100 establishes wireless communication with the AP 200. The external storage apparatus 300 is connected to the AP 200 via a cable (such as a LAN cable), for example, and can perform wired communication with the AP 200. The digital camera body 100 establishes wireless communication with the AP 200, joins a network formed by the AP 200, and transmits and receives predetermined data, such as image data, with the external storage apparatus 300. As will be described later, the digital camera body 100 and the AP 200 conforms to a plurality of communication methods, and can perform BT communication and wireless LAN communication, for example. Note that the external storage apparatus 300 need not be connected to the AP 200 via a cable, and may alternatively be a NAS that directly joins a wireless network.
Configuration of Apparatuses Including Digital Camera Body 100 etc.

Figure 2:
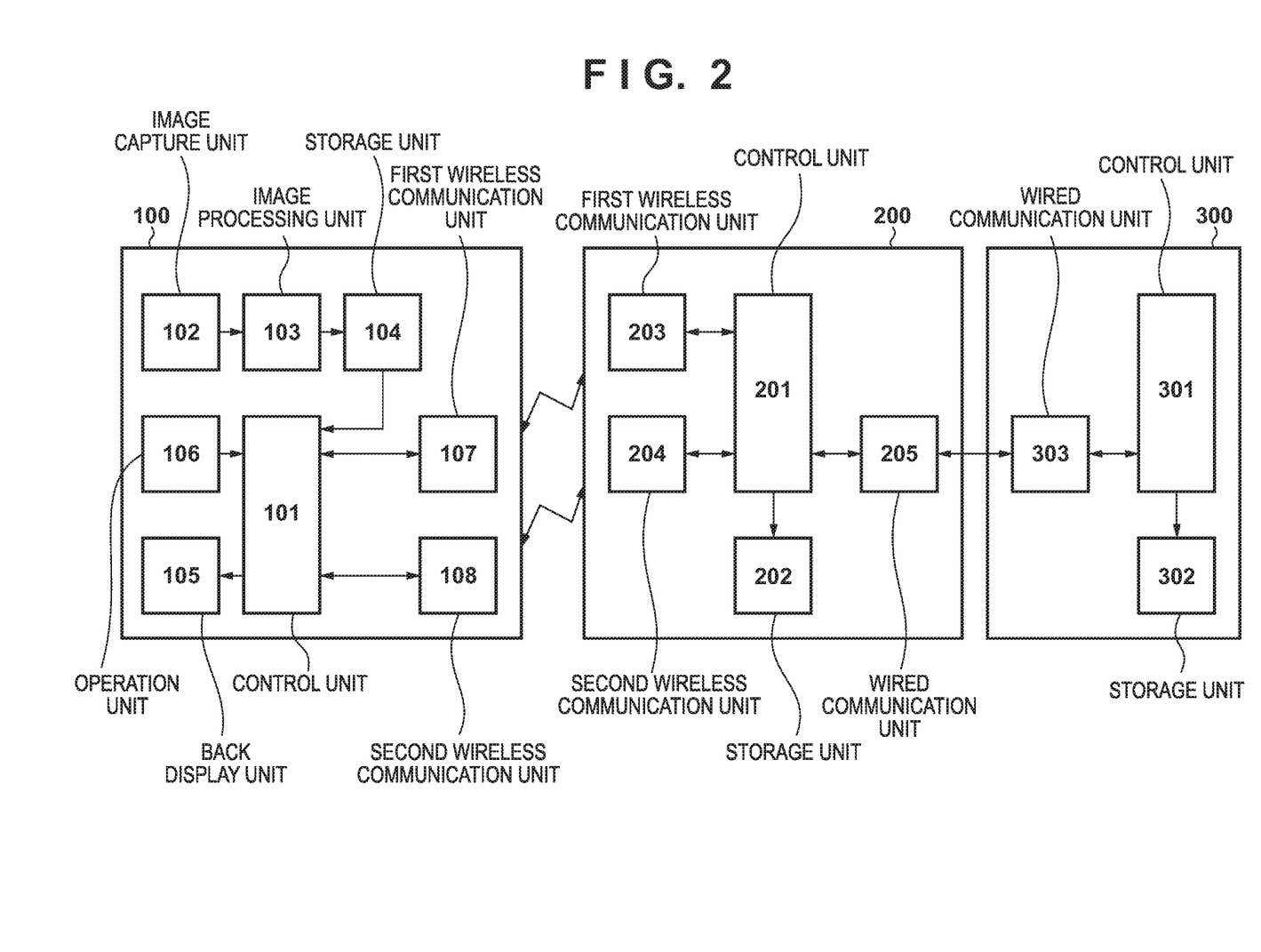
FIG. 2 is a block diagram showing an example of a functional configuration of a digital camera body, an AP (access point), and an external storage apparatus according to Embodiment 1.

First, a configuration of the digital camera body 100 will be described. FIG. 2 is a block diagram showing an example of a functional configuration of the digital camera body 100, the access point 200, and the external storage apparatus 300, each of which are an example of a communication apparatus in this embodiment. Note that one or more functional blocks shown in FIG. 2 may be realized by hardware such as an ASIC or a programmable logic array (PLA), or may be realized by a programmable processor, such as a CPU or an MPU, executing software. Also, one or more functional blocks may be realized by a combination of software and hardware. Accordingly, in the following description, even if different functional blocks are described as portions that mainly perform operations, these portions may be realized by the same hardware.

A control unit 101 includes a CPU (or a MPU, or a GPU), a ROM, and a RAM, for example, and executes a program stored in the ROM to control blocks in the digital camera body 100 and control data transfer between blocks. The control unit 101 also controls blocks in the digital camera body 100 in accordance with an operation signal from an operation unit 106, which accepts an operation performed by a user. As will be described later, the control unit 101 performs handover processing using BeamForming information. Note that various circuits or the like (not shown) required for shooting and reproduction may further be connected to the control unit 101.

An image capture unit 102 includes an imaging optical system, which includes a diaphragm, lenses, and so on, and an image sensor. The image sensor has a configuration in which a plurality of pixels, each of which has a photoelectric transducer, are arranged two-dimensionally. The image sensor performs, at each pixel, photoelectric conversion on an object optical image formed by the imaging optical system, further performs analog-to-digital conversion using an A/D conversion circuit, and outputs a digital signal (image data) pixel-by-pixel. The image sensor may be a CCD (Charge-Coupled Device) image sensor, a CMOS (Complementary Metal Oxide Semiconductor) image sensor, or the like. An image processing unit 103 includes a calculation circuit for image processing, and performs predetermined image processing for increasing image quality or for compression/expansion on the captured image data.

A storage unit 104 is, for example, a large-capacity, random-accessible nonvolatile recording medium, such as a semiconductor memory, and stores image data such as still image data and moving image data output from the image processing unit 103, or information regarding various settings of the digital camera body 100. Note that the storage unit 104 may also be provided with a mechanism for enabling a memory card or the like to be attached and ejected.

A back display unit 105 includes, for example, a display device such as a liquid crystal display, an organic EL display, or an electronic paper, and performs captured image display, i.e. displays image data captured by the image capture unit 102, and reproduced image display, i.e. displays image data stored in the storage unit 104. The back display unit 105 also displays a menu screen for a user to operate the digital camera body 100.

An operation unit 106 includes switches or the like for inputting various operations relating to image shooting, such as a power button, a still image recording button, and a button for giving instructions to start and stop recording a moving image, for example. The operation unit 106 also has a menu display button, a decide button, other cursor keys, a pointing device, a touch panel, and so on, and if any of these keys and buttons is operated by the user, the operation unit 106 transmits an operation signal to the control unit 101. A portion of the operation unit 106, such as the touch panel, may also be used integrally with the back display unit 105.

A first wireless communication unit 107 includes a communication interface that conforms to a Bluetooth (registered trademark) communication method, for example. That is to say, the digital camera body 100 can communicate with the AP 200 by means of BT communication, via the first wireless communication unit 107. In the communication method performed using the first wireless communication unit 107, less power is consumed than in a communication method performed using a second wireless communication unit 108.

The second wireless communication unit 108 includes a communication interface for a wireless LAN that conforms to the communication method under IEEE 802.11 standard, for example. The digital camera body 100 can communicate with the AP 200 by means of wireless LAN communication, via the second wireless communication unit 108. Also, image data or the like can be transmitted to and received from the external storage apparatus 300 via the AP 200 by using an upper-level protocol, such as TCP/IP.

Configuration of AP 200

Next, a configuration of the AP 200 will be described.

A control unit 201 includes, for example, a CPU (or a MPU or a GPU), a ROM, and a RAM, and executes a program stored in the ROM to control blocks in the AP 200 and control data transfer between blocks. Various circuits or the like (not shown) needed for the AP 200 in FIG. 2 may further be connected to the control unit 201.

A storage unit 202 is, for example, a random-accessible nonvolatile recording medium, such as a semiconductor memory, and stores information regarding various settings of the AP 200.

A first wireless communication unit 203 conforms to the Bluetooth (registered trademark) communication method, for example, and includes a communication interface capable of BeamForming for enhancing the directionality of radio waves in a predetermined direction.

A second wireless communication unit 204 conforms to a wireless LAN communication method, for example, and includes a communication interface capable of BeamForming. A wired communication unit 205 includes a communication interface that conforms to a wired LAN communication method.

Configuration of External Storage Apparatus 300

Next, the external storage apparatus 300 will be described.

A control unit 301 includes, for example, a CPU (or a MPU or a GPU), a ROM, and a RAM, and executes a program stored in the ROM to control blocks in the external storage apparatus 300 and control data transfer between blocks. Note that various circuits or the like (not shown) required for processing data to be communicated or received may further be connected to the control unit 301.

A storage unit 302 is, for example, a large-capacity, random-accessible nonvolatile recording medium, such as a semiconductor memory or a hard disk, and stores various data received via a wired communication unit 303, including image data, or information regarding various settings of the external storage apparatus 300. The wired communication unit 303 includes a communication interface that conforms to a wired LAN communication method.

Series of Operations Associated with Handover Using Beamforming Information

Figure 3A:
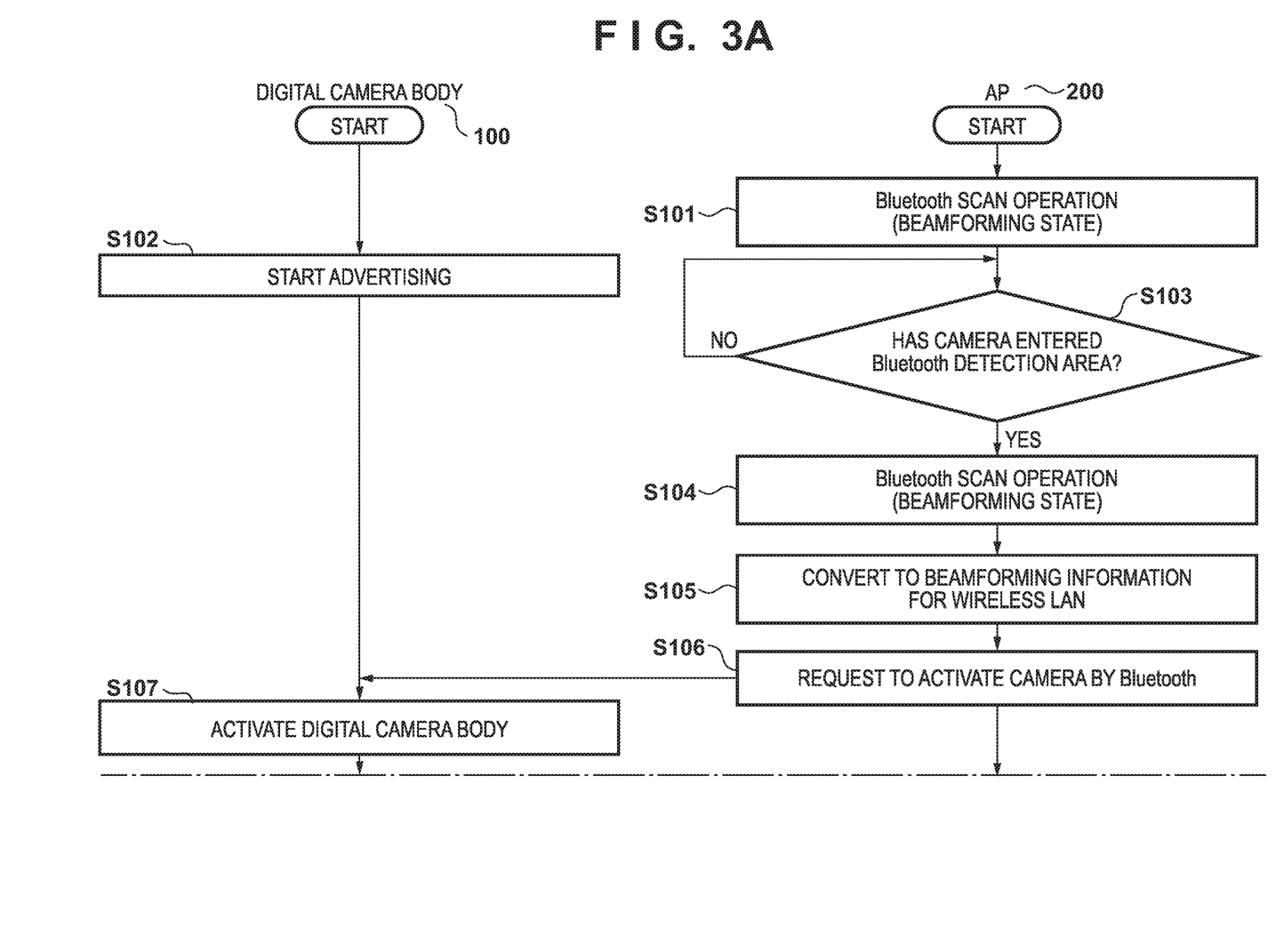
FIG. 3A is a flowchart (1) showing a series of operations in handover processing using BeamForming information according to Embodiment 1.
Figure 3B:
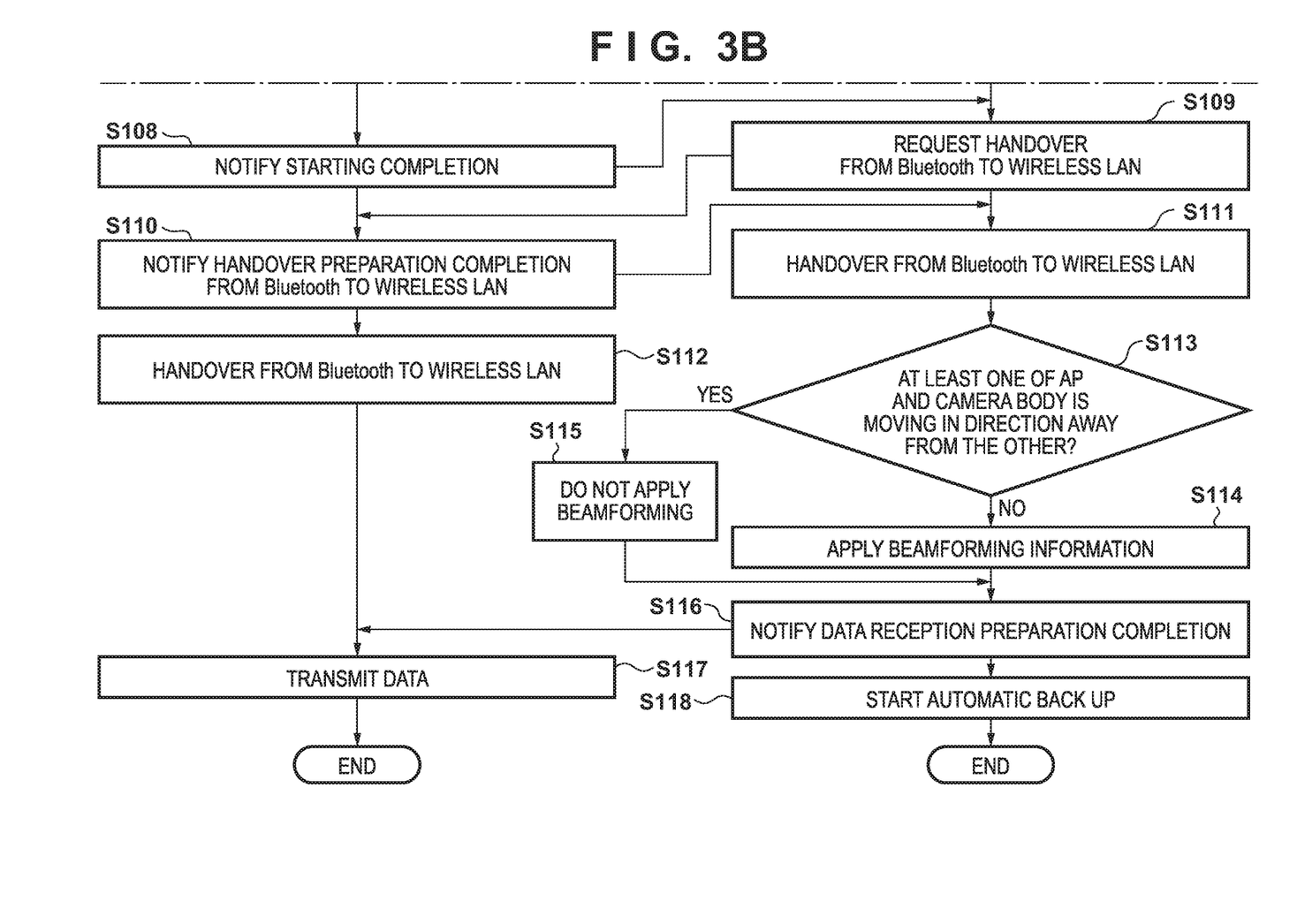
FIG. 3B is a flowchart (2) showing a series of operations in handover processing using BeamForming information according to Embodiment 1.

Next, a description will be given, with reference to FIGS. 3A and 3B, of a series of operations in handover processing using BeamForming information, while taking, as an example, automatic data backup performed by the digital camera body 100, the AP 200, and the external storage apparatus 300. Note that, in the series of operations shown in FIGS. 3A and 3B, processing in the digital camera body 100 is realized by the control unit 101 loading a program stored in the ROM to a working area of the RAM and executing this program to control each unit, unless otherwise stated. Similarly, processing in the AP 200 and processing in the external storage apparatus 300 are realized, respectively, by the control unit 201 and the control unit 301 loading programs stored in the respective ROMs to work areas of the respective RAMs and executing these programs to control each unit.

In step S101, the AP 200 performs BeamForming to search for an external apparatus capable of BT communication in a predetermined area, by controlling the first wireless communication unit 203. A configuration may alternatively be employed in which a temporary area is predetermined in which the communication speed in wireless LAN communication between the AP 200 and the digital camera body 100 increases, and the first wireless communication unit 203 in the AP 200 performs BeamForming in this area to perform the search.

Figure 4:
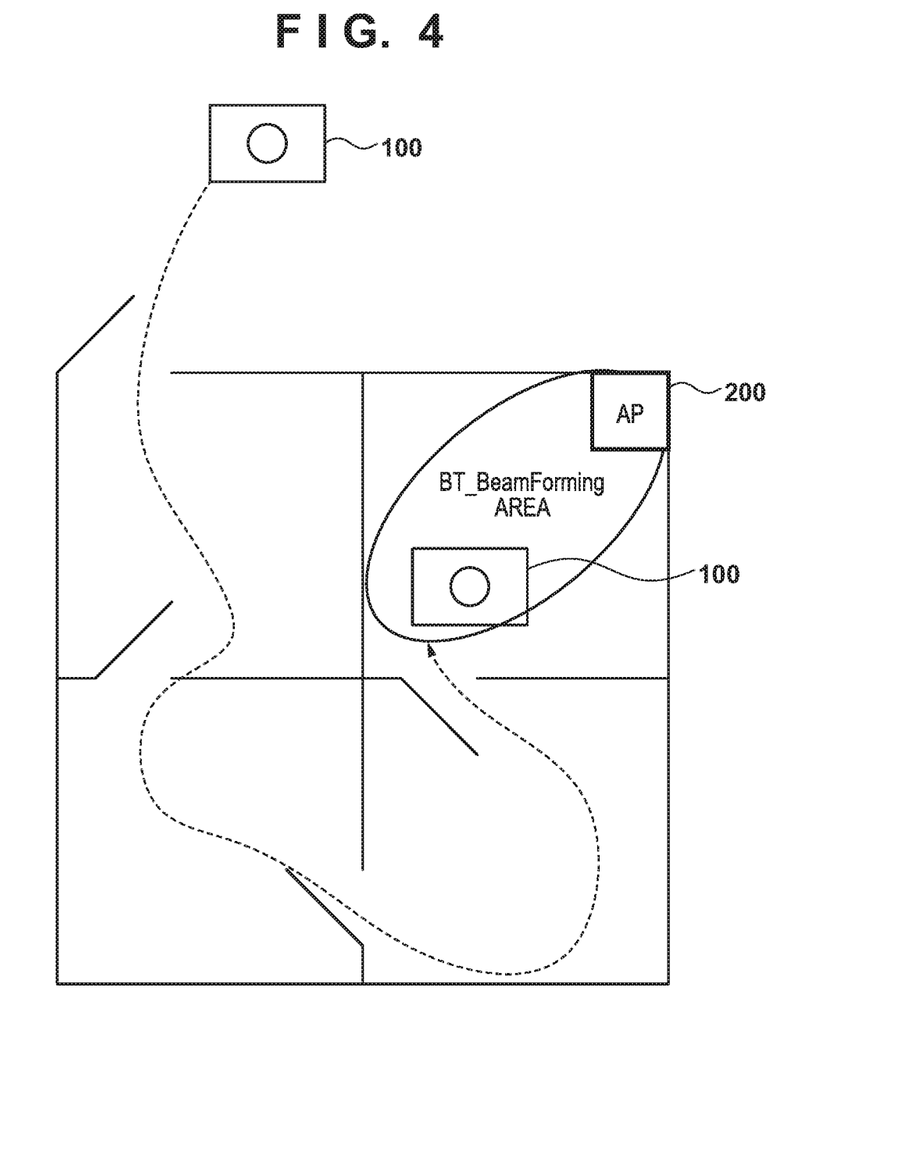
FIG. 4 illustrates a communication area of a first wireless communication unit provided in the AP.

In step S102, the digital camera body 100 controls the first wireless communication unit 107 to start advertising. Meanwhile, in step S103, the AP 200 determines whether or not the digital camera body 100 has entered a BT communication detection area, based on a signal from the first wireless communication unit 203 in the AP 200. For example, if the first wireless communication unit 203 in the AP 200 detects advertising transmitted from the digital camera body 100, the AP 200 determines that the digital camera body 100 has entered the area formed by BeamForming. This state is a state shown in FIG. 4, for example. FIG. 4 shows a state where the user has moved through four rooms while carrying the digital camera body 100, and entered a room in which the AP 200 is installed. The AP 200 controls the first wireless communication unit 107 and forms a BT_BeamForming area shown in FIG. 4 as the search area in step S101. Upon the digital camera body 100 entering this area, the AP 200 detects advertising from the digital camera body 100. If it is determined that the digital camera body 100 has entered the BT communication detection area, the AP 200 advances the processing to step S104, and if it is determined that the digital camera body 100 has not entered the detection area, the AP 200 returns to step S103 again and continues detection.

In step S104, the AP 200 acquires, from the first wireless communication unit 203, BeamForming information (distance, angle etc.) of the first wireless communication unit 203 when it was determined that the digital camera body 100 has entered the area. This is to overlap, when the AP 200 forms an area with high transmission power through BeamForming in wireless LAN communication, this area with an area formed by BeamForming in BT communication (at the position of the digital camera body 100). This is because, if the digital camera body 100 is in the area formed in BT communication but is not in the area with high transmission power in wireless LAN communication, favorable communication performance may not be obtained when handover is performed from BT communication to wireless LAN communication.

In step S105, the AP 200 converts the BeamForming information of the first wireless communication unit 203 obtained in step S104 to BeamForming information for a wireless LAN to be used by the second wireless communication unit 204. At this time, the AP 200 specifies the position of the digital camera body 100 based on the BeamForming information (distance and angle information for specifying the BeamForming area) of the first wireless communication unit 203. The AP 200 causes the second wireless communication unit 204 to perform BeamForming based on the specified position of the digital camera body 100. That is to say, the area that is formed by BeamForming performed by the second wireless communication unit 204 and in which transmission power is higher than a predetermined value then includes the specified position of the digital camera body 100.

In step S106, the AP 200 controls the first wireless communication unit 203 to transmit, to the digital camera body 100, an activation request for requesting the digital camera body 100 to activate. In step S107, upon digital camera body 100 receiving the activation request from the AP 200, the digital camera body 100 activates itself (i.e.

causes units excluding the communication functions to be operable). After the activating of digital camera body 100 has been completed, in step S108, the digital camera body 100 transmits an activation completion notification to the AP 200.

In step S109, the AP 200 controls the first wireless communication unit 203 to transmit, to the digital camera body 100, a request for handover from BT communication to wireless LAN communication. In step S110, after preparation for handover from the wireless communication method using the first wireless communication unit 107 to the wireless communication method using the second wireless communication unit 108 has been completed, the digital camera body 100 controls the first wireless communication unit 107 to transmit a preparation completion notification to the AP 200. Note that, although not clearly shown in FIGS. 3A and 3B, the digital camera body 100 may transmit and receive, to and from the AP 200, parameters (identifier, password etc.) required to start wireless LAN communication, before transmitting the preparation completion notification.

In step S111, the AP 200 controls the first wireless communication unit 203 and the second wireless communication unit 204 to perform handover from BT communication using the first wireless communication unit 203 to wireless LAN communication using the second wireless communication unit 204. Also, in step S112, the digital camera body 100 controls the first wireless communication unit 107 and the second wireless communication unit 108 to perform handover from BT communication using the first wireless communication unit 107 to wireless communication using the second wireless communication unit 108.

In step S113, the AP 200 determines, using the first wireless communication unit 203, whether or not at least one of the apparatuses, namely the digital camera body 100 and the AP 200 is moving in a direction away from the other. For example, the AP 200 obtains reception radio field intensity in wireless communication (BT communication) between the first wireless communication unit 203 in the AP 200 and the first wireless communication unit 107 in the digital camera body 100 (from the digital camera body 100). If the reception radio field intensity falls below a predetermined value, it is determined that one of these apparatuses is moving in a direction away from the other. If it is determined that at least one of the apparatuses is moving in a direction away from the other, the AP 200 advances the processing to step S115, and if not, the AP 200 advances the processing to step S114.

In step S114, the AP 200 controls the second wireless communication unit 204 to start BeamForming while applying the BeamForming information for the wireless LAN communication that has been converted in step S105. That is to say, the aforementioned BeamForming is applied to the wireless LAN communication used by the second wireless communication unit 204. Thus, a situation can be prevented where the digital camera body 100 is present in the BeamForming area of BT communication that has been set during the search in step S101 but is present out of the BeamForming area of wireless LAN communication. If the digital camera body 100 transfers predetermined data to the external storage apparatus 300 to back up the data, lengthening of the communication time and an increase in battery exhaustion can be prevented.

On the other hand, in step S115, the AP 200 controls the second wireless communication unit 204 to not apply the BeamForming information for the wireless LAN that has been converted in step S105 to the BeamForming. This is because the digital camera body 100 is highly likely to have moved out of the BeamForming area that was set during the search in step S101, due to movement of the digital camera body 100 or the AP 200. Accordingly, as a result of BeamForming based on the BeamForming information being not performed, the case can be reduced where the communication speed is lowered, the communication time increases, and thus the battery is further exhausted.

In step S116, the AP 200 controls the first wireless communication unit 203 to transmit a data reception preparation completion notification to the digital camera body 100. Meanwhile, in step S117, upon receiving the data reception preparation completion notification from the AP 200, the digital camera body 100 performs control for backup in order to transmit predetermined data, such as image data, to the external storage apparatus 300 in the network. For example, the digital camera body 100 controls the second wireless communication unit 108 to transmit the predetermined data to the AP 200. After completing the transmission of the predetermined data, the digital camera body 100 ends the series of processing.

In step S118, the AP 200 controls the second wireless communication unit 204 to receive the data from the digital camera body 100. Also, the AP 200 transmits the received data from the wired communication unit 205 to the storage unit 302 in the external storage apparatus 300 to store this data therein, and thus automatically backs up the predetermined data from the digital camera body 100. After completing the transmission of the data to be backed up to the external storage apparatus 300, the AP 200 ends the series of processing.

Note that this embodiment has described an example in which, if it is determined that either one of the digital camera body 100 and the AP 200 is moving away from the other (e.g. such that the distance between these apparatuses increases), the AP 200 performs wireless LAN communication while not applying BeamForming thereto. However, a configuration may alternatively be employed in which wireless LAN communication is not started while it is determined that such movement is occurring. Furthermore, a configuration may alternatively be employed in which, if it is determined that one of the apparatuses is moving away, the AP 200 returns the processing to step S101 without starting backup, and performs BeamForming again through BT communication to search for an apparatus capable of BT communication. In this case, the digital camera body 100 returns the processing to step S102 again to start advertising.

As described above, in the case of performing handover from BT communication to wireless LAN communication, the AP according to this embodiment determines the directionality of BeamForming in wireless LAN communication, using information regarding the directionality of BeamForming in BT communication. In other words, the search area formed by BeamForming in BT communication is overlapped with the area with high transmission power formed by BeamForming in the wireless LAN at the position of the digital camera body 100. With this configuration, a situation can be prevented where a counterpart communication apparatus after the handover is present out of the area with high transmission power formed by BeamForming in wireless LAN communication. That is to say, the counterpart communication apparatus can perform handover at a location where the communication speed in wireless LAN communication is high. In other words, in the case of performing handover using a plurality of communication methods capable of enhancing the directionality of radio waves, degradation in communication quality after the handover can be suppressed. In addition, in the case of backing up data of the counterpart communication apparatus via an AP, the backup time is shortened, and battery exhaustion in the communication apparatus can be reduced.

Also, if a predetermined condition is not satisfied, the AP in this embodiment does not determine the directionality of radio waves in second wireless communication using information regarding the directionality of radio waves in first wireless communication. Furthermore, whether or not the predetermined condition is satisfied is determined based on whether or not the positional relationship between the AP and the counterpart communication apparatus is changing in a direction such that they are moving away from each other. Thus, in the case where the AP and the counterpart communication apparatus are highly likely to be present out of the area formed by BeamForming in BT communication, a situation can be prevented where an area formed by BeamForming in the wireless LAN is set in an area similar to the area formed by BeamForming in BT communication.

Embodiment 2

Next, Embodiment 2 will be described. After performing handover to wireless LAN communication, the AP 200 in Embodiment 2 cancels BeamForming in BT communication, and searches for a surrounding communication apparatus in a wider area (i.e. an area with less directionality). That is to say, a series of operations associated with handover according to this embodiment follows the series of processing associated with handover described in Embodiment 1. Accordingly, the configurations of the digital camera body 100, the AP 200, and the external storage apparatus 300 in this embodiment, and the above-described series of operations associated with handover are common to both Embodiments 1 and 2. For this reason, the same constituents are assigned the same reference numerals and redundant descriptions are omitted. Differences will be described intensively.

First, a configuration of a communication system 2 according to this embodiment will be described with reference to FIG. 5. In this embodiment, a digital camera body 400 is present in addition to the constituent elements of the communication system 1 described in Embodiment 1. The digital camera body 400 can perform BT communication and wireless LAN communication, similarly to the digital camera body 100, and can establish communication with the AP 200.

In the communication system 2, the case is envisioned where the digital camera body 400 appears near the AP 200 when the digital camera body 100 and the AP 200 are communicating with each other for backup. In the above-described Embodiment 1, the AP 200 overlaps the search area formed by BeamForming in BT communication with the area with high transmission power formed by BeamForming in the wireless LAN, at the position of the digital camera body 100. For this reason, when the digital camera body 100 is communicating data to be backed up by means of wireless LAN communication, the area formed by BeamForming in BT communication that has been set by the AP 200 maintains a state of including the position of the digital camera body 100. In this case, the digital camera body 400, which has newly appeared, may not be detected in the search area for BT communication formed by the AP 200. The following description will describe a wireless communication system in which both apparatuses, namely the digital camera body 100 and the digital camera body 400 can perform communication for backup with the AP 200.

Configuration of Digital Camera Body 400

Figure 5:
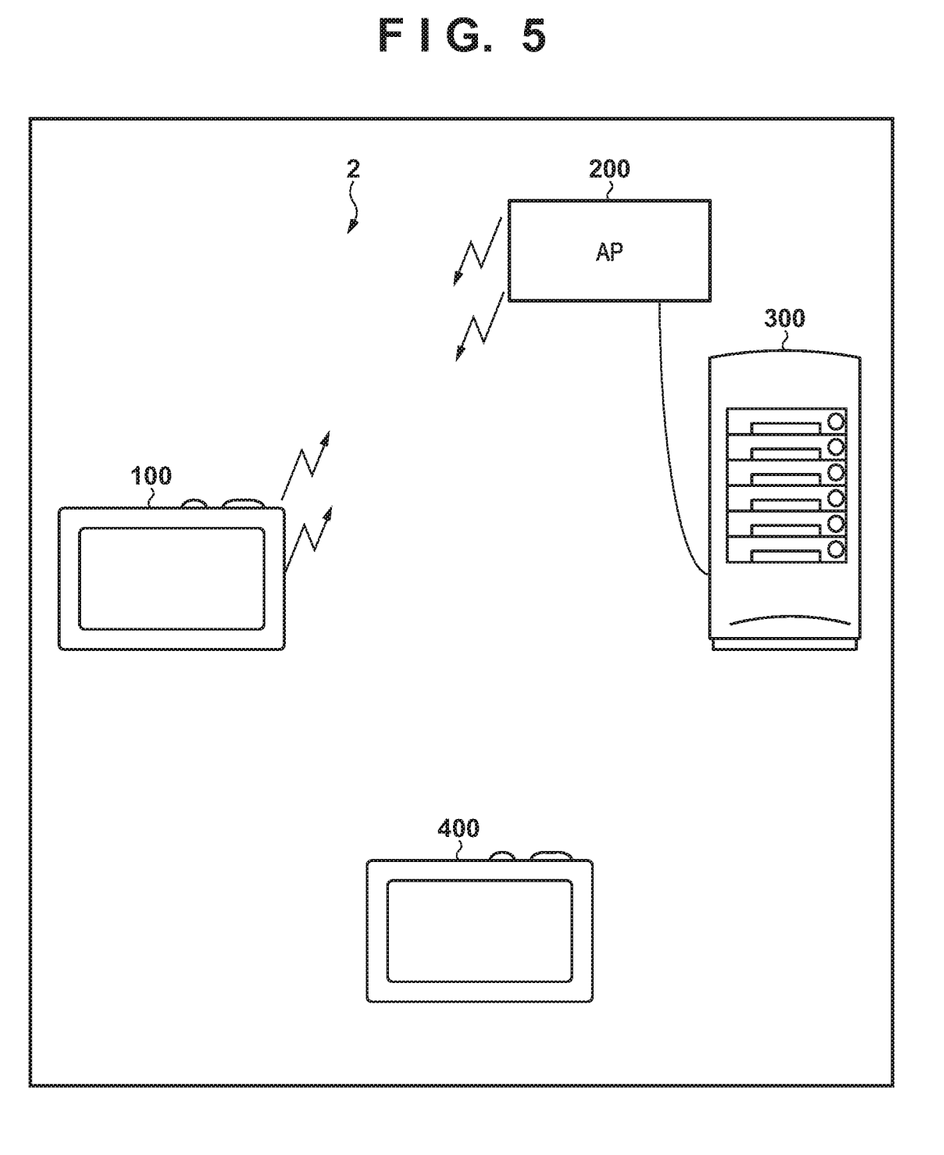
FIG. 5 schematically shows a configuration of a communication system according to Embodiment 2.
Figure 6:
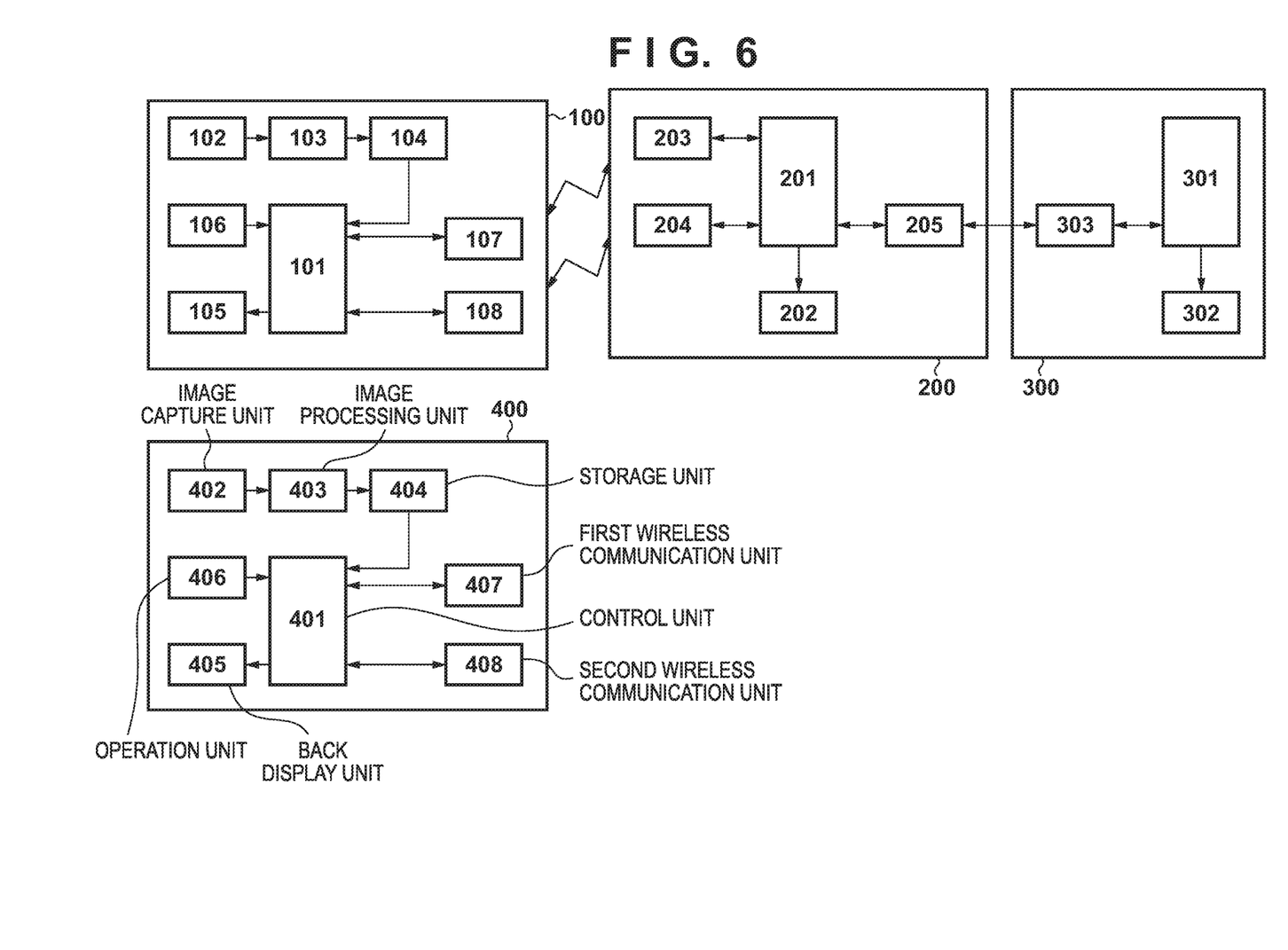
FIG. 6 is a block diagram showing an example of a functional configuration of digital camera bodies (100 and 600), an AP, and an external storage apparatus according to Embodiment 2.

FIG. 6 shows an example of functional configurations of the digital camera body 100, the digital camera body 400, the AP 200, and the external storage apparatus 300 shown in FIG. 5.

The functional configuration of the digital camera body 400 may be the same as the aforementioned configuration of the digital camera body 100. That is to say, configurations of 401 to 408 that constitute the digital camera body 400 correspond to 101 to 108, respectively, that constitute the digital camera body 100.

Series of Operations in Wireless Communication System

Figure 7A:
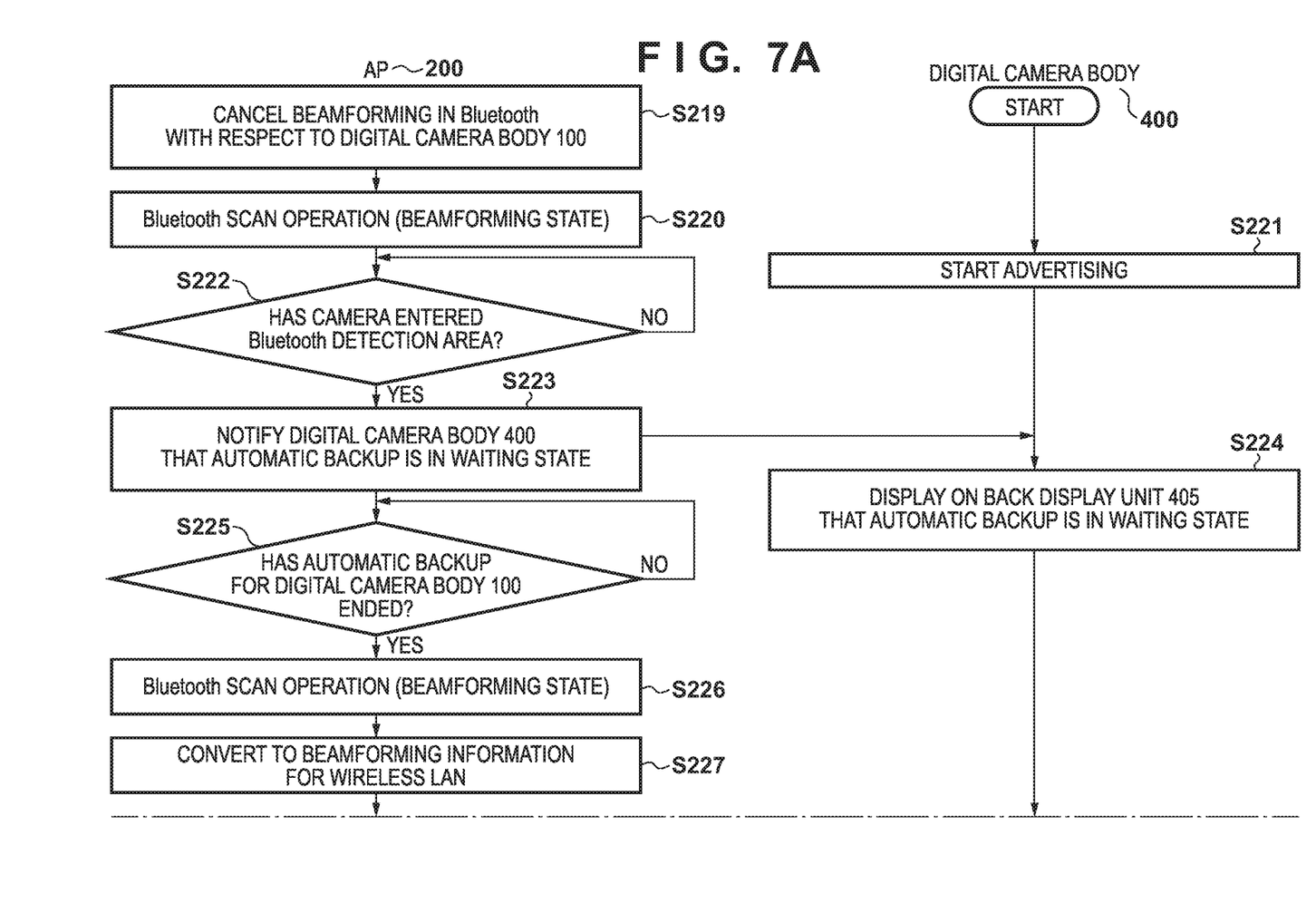
FIG. 7A is a flowchart (1) showing a series of operations in handover processing using BeamForming information according to Embodiment 2.
Figure 7B:
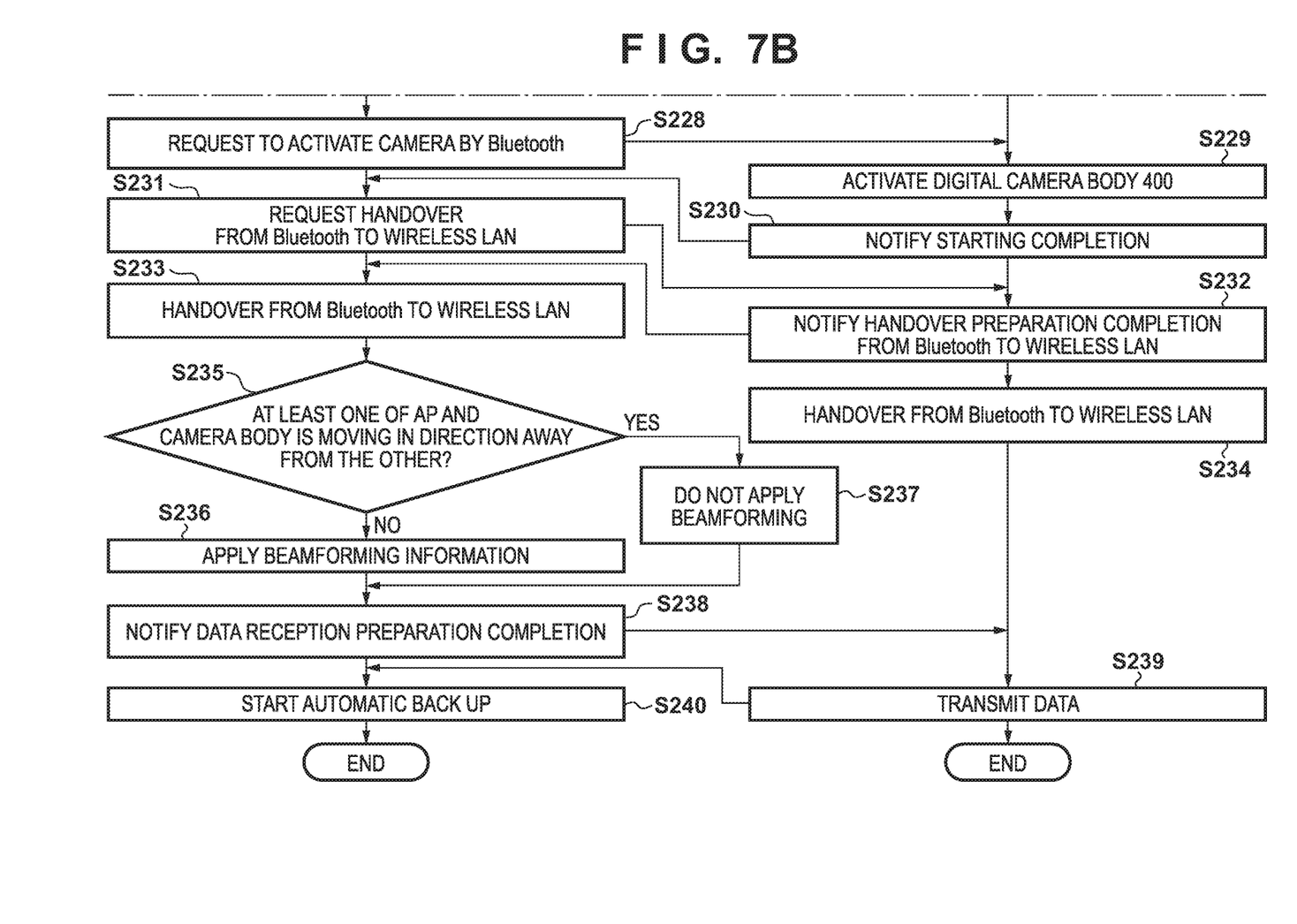
FIG. 7B is a flowchart (2) showing a series of operations in handover processing using BeamForming information according to Embodiment 2.

Next, a series of operations associated with handover according to this embodiment will be described with reference to FIGS. 7A and 7B. Note that this processing is started if, after steps S101 to S118 performed by the digital camera body 100 and the AP 200 described in Embodiment 1 have been performed, the digital camera body 400 appears around the AP 200 while step S118 is performed. Note that, in the series of operations shown in FIGS. 7A and 7B, processing in the digital camera body 400 is realized by the control unit 401 loading a program stored in the ROM to a working area of the RAM and executing this program to control each unit, unless otherwise stated. Similarly, processing in the AP 200 and processing in the external storage apparatus 300 are realized, respectively, by the control unit 201 and the control unit 301 loading programs stored in the respective ROMs to work areas of the respective RAMs and executing these programs to control each unit.

In step S219, the AP 200 cancels BeamForming in BT communication that is controlled by the first wireless communication unit 203 with respect to the digital camera 100. In step S220, the AP 200 performs BeamForming and searches for an external apparatus capable of BT communication in a predetermined area, by controlling the first wireless communication unit 203. At this time, the AP 200 may form a search area without providing directionality to a specific direction. Also, the AP 200 may form a search area while providing directionality different from that of the search area formed when BT communication with the digital camera body 100 was established. In step S221, the digital camera body 400 controls the first wireless communication unit 407 to start advertising for BT communication.

In step S222, the AP 200 controls the first wireless communication unit 203 to determine whether or not the digital camera body 400 has entered the BT communication detection area. For example, if the first wireless communication unit 203 in the AP 200 detects advertising transmitted from the digital camera body 400, the AP 200 determines that the digital camera body 400 has entered the area formed by BeamForming. Upon the digital camera body 400 entering this area, the AP 200 detects advertising from the digital camera body 400. If it is determined that the digital camera body 400 has entered the BT communication detection area, the processing proceeds to step S223, and if it is determined that the digital camera body 400 has not entered the detection area, the processing again returns to step S222, and detection is continued.

In step S223, the AP 200 notifies the digital camera body 400 that automatic backup cannot be started, that is, automatic backup is in a waiting state.

In step S224, upon receiving information regarding the waiting state via the first wireless communication unit 407, the digital camera body 400 displays, on the back display unit 405, that automatic backup of data in the digital camera body 400 is in a waiting state. A user of the digital camera body 400 can understand that backup of data in the digital camera body 400 is in the waiting state.

In step S225, the AP 200 determines whether or not automatic backup for the digital camera body 100 has ended. If it is determined that automatic backup for the digital camera body 100 has not ended, the AP 200 returns to step S225 to continue automatic backup. On the other hand, if it is determined that automatic backup for the digital camera body 100 has ended, the processing proceeds to step S226.

In step S226, the AP 200 obtains BeamForming information (distance, angle etc.) from the first wireless communication unit 203 when it is determined in step S222 that the digital camera body 400 has entered the area.

In step S227, the AP 200 converts the BeamForming information from the first wireless communication unit 203 obtained in step S226 to BeamForming information for the wireless LAN to be used by the second wireless communication unit 204. At this time, the AP 200 specifies the position of the digital camera body 400 based on the BeamForming information (distance and angle information for specifying the BeamForming area) of the first wireless communication unit 203. The AP 200 causes the second wireless communication unit 204 to perform BeamForming based on the specified position of the digital camera body 400. That is to say, the area that is formed by BeamForming performed by the second wireless communication unit 204 and in which transmission power is higher than a predetermined value then includes the specified position of the digital camera body 400.

In step S228, the AP 200 controls the first wireless communication unit 203 to transmit, to the digital camera body 400, an activation request for requesting the digital camera body 400 to activate. In step S229, upon receiving the activation request from the AP 200, the digital camera body 400 activates itself (i.e. causes units excluding the communication functions to be operable). After the activating of digital camera body 400 has been completed, in step S230, the digital camera body 400 transmits an activation completion notification to the AP 200.

In step S231, the AP 200 controls the first wireless communication unit 203 to transmit, to the digital camera body 400, a request for handover from BT communication to wireless LAN communication. In step S232, after preparation for handover from the wireless communication method using the first wireless communication unit 407 to the wireless communication method using the second wireless communication unit 408 has been completed, the digital camera body 400 controls the first wireless communication unit 407 to transmit a preparation completion notification to the AP 200. Note that, although not clearly shown in FIGS. 7A and 7B, the digital camera body 400 may transmit and receive, to and from the AP 200, parameters (identifier, password etc.) required to start wireless LAN communication before transmitting the preparation completion notification.

In step S233, the AP 200 controls the first wireless communication unit 203 and the second wireless communication unit 204 to perform handover from BT communication using the first wireless communication unit 203 to wireless LAN communication using the second wireless communication unit 204. Also, in step S234, the digital camera body 400 controls the first wireless communication unit 407 and the second wireless communication unit 408 to perform handover from BT communication using the first wireless communication unit 407 to wireless communication using the second wireless communication unit 408.

In step S235, the AP 200 determines, using the first wireless communication unit 203, whether or not at least one of the digital camera body 400 and the AP 200 is moving in a direction away from the other. For example, the AP 200 obtains reception radio field intensity in wireless communication (BT communication) between the first wireless communication unit 203 in the AP 200 and the first wireless communication unit 407 in the digital camera body 400 (from the digital camera body 400). If the reception radio field intensity falls below a predetermined value, it is determined that at least one of these apparatuses is moving in a direction away from the other. If it is determined that at least one of the apparatuses is moving in a direction away from the other, the AP 200 advances the processing to step S237, and if not, the AP 200 advances the processing to step S236.

In step S236, the AP 200 controls the second wireless communication unit 204 to start BeamForming while applying the BeamForming information for the wireless LAN that has been converted in step S227. That is to say, the aforementioned BeamForming is applied to the wireless LAN used by the second wireless communication unit 204. Thus, a situation can be prevented where the digital camera body 400 is present in the BeamForming area of BT communication that has been set during the search in step S220 but is present out of the BeamForming area of wireless LAN communication. That is to say, in the case where the digital camera body 400 transfers predetermined data to the external storage apparatus 300 to back up the data, lengthening of the communication time and an increase in battery exhaustion can be prevented.

Meanwhile, in step S237, the AP 200 controls the second wireless communication unit 204 to not apply the BeamForming information for the wireless LAN that has been converted in step S227 to the BeamForming. This is because the digital camera body 400 is highly likely to have moved out of the BeamForming area that has been set during the search in step S220, due to movement of the digital camera body 400 or the AP 200. Accordingly, as a result of BeamForming based on the BeamForming information being not performed, the case can be reduced where the communication speed is lowered, the communication time increases, and thus the battery is further exhausted.

In step S238, the AP 200 controls the first wireless communication unit 203 to transmit a data reception preparation completion notification to the digital camera body 400. Meanwhile, if, in step S239, the digital camera body 400 receives the data reception preparation completion notification from the AP 200, the digital camera body 400 performs control for backup in order to transmit predetermined data, such as image data, to the external storage apparatus 300 in the network. For example, the digital camera body 400 controls the second wireless communication unit 408 to transmit the data to the AP 200. After completing the transmission of the data, the digital camera body 400 ends the series of processing.

In step S240, the AP 200 controls the second wireless communication unit 204 to receive the data from the digital camera body 400. Also, the AP 200 transmits the received data from the wired communication unit 205 to the storage unit 302 in the external storage apparatus 300 to store this data, and thus automatically backs up the predetermined data from the digital camera body 400. After completing the transmission of the data to be backed up to the external storage apparatus 300, the AP 200 then ends the series of processing.

As described above, in this embodiment, after completing handover with a first communication apparatus, the AP can cancel BeamForming in BT communication and search for a second communication apparatus in BT communication. With this configuration, a wireless communication system in which data can be backed up from a plurality of digital camera bodies via the AP is realized, and thus, user convenience can be improved.

Other Embodiments (1)

The above embodiment has described an example in which the AP 200 controls BeamForming in BT communication and wireless LAN communication. However, the above-described processing performed by the AP 200 is also applicable to the case where the digital camera body 100 operates as an access point in wireless LAN communication, and can directly establish wireless communication with the external storage apparatus 300. In this case, in the case of performing handover from BT communication to wireless LAN communication, the digital camera body 100 may determine the directionality of BeamForming in wireless LAN communication, based on information regarding the directionality of BeamForming in BT communication.

According to the present invention, when handover is performed using a plurality of communication methods capable of causing radio waves to have directionality, degradation in communication quality after the handover can be suppressed.

Other Embodiments (2)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
one or more processors; and
a memory storing instructions which, when the instructions are executed by the one or more processors, cause the communication apparatus to function as:
a first communication unit configured to communicate with an external apparatus using a first communication method in which directionality of radio waves is variable;
a second communication unit configured to communicate with the external apparatus using a second communication method in which directionality of radio waves is variable, the second communication method being different from the first communication method; and
a control unit configured to control the first communication unit and the second communication unit so as to, after communication using the first communication method has been established, switch communication with the external apparatus to communication using the second communication method,
wherein, in a case of switching the communication with the external apparatus to the communication using the second communication method, the control unit controls directionality of second radio waves in the second communication method, using information regarding directionality of first radio waves used in the first communication method.

2. The communication apparatus according to claim 1, wherein the control unit controls the directionality of the second radio waves in the second communication method such that an area formed based on the directionality of the first radio waves in the first communication method and an area formed based on the directionality of the second radio waves in the second communication method and having transmission power that is higher than a predetermined value overlap.

3. The communication apparatus according to claim 2, wherein the information regarding the directionality of the first radio waves includes information representing a direction and a distance that specify the directionality of the first radio waves.

4. The communication apparatus according to claim 3, wherein the instructions further cause the communication apparatus to functions as
a specifying unit configured to specify a position of the external apparatus from which radio waves have been received using the first communication method, based on the information representing the direction and the distance that specify the directionality of the first radio waves,
wherein the control unit controls the directionality of the second radio waves in the second communication method such that the specified position of the external apparatus is included in the area having transmission power that is higher than the predetermined value.

5. The communication apparatus according to claim 1, wherein the instructions further cause the communication apparatus to functions as
an acquiring unit configured to acquire reception radio field intensity of radio waves received by the external apparatus in the second communication method,
wherein, in a case of switching the communication with the external apparatus to the communication using the second communication method, the control unit determines, in accordance with the reception radio field intensity, whether or not to use the information regarding the directionality of the first radio waves used in the first communication method.

6. The communication apparatus according to claim 1, wherein the instructions further cause the communication apparatus to functions as
an acquiring unit configured to acquire reception radio field intensity of radio waves received by the external apparatus in the second communication method,
wherein, in a case of switching the communication with the external apparatus to the communication using the second communication method, the control unit does not use the information regarding the directionality of the first radio waves used in the first communication method if the reception radio field intensity falls below a predetermined value.

7. The communication apparatus according to claim 1, wherein the control unit sets the directionality of the first radio waves in the first communication method, the directionality being for forming an area in which a presence of the external apparatus is to be detected.

8. The communication apparatus according to claim 1, wherein the control unit cancels the directionality of the first radio waves used in the first communication method after the communication with the external apparatus has switched to the communication using the second communication method.

9. The communication apparatus according to claim 8, wherein the control unit controls the first communication unit so as to not set directionality to a predetermined direction in the first communication method, by canceling the directionality of the first radio waves used in the first communication method.

10. The communication apparatus according to claim 8, wherein the control unit controls the first communication unit such that the first communication method has directionality different from the directionality of the first radio waves, by canceling the directionality of the first radio waves used in the first communication method.

11. The communication apparatus according to claim 1, wherein power consumption in the first communication method is lower than power consumption in the second communication method.

12. The communication apparatus according to claim 1, wherein the first communication method conforms to a Bluetooth (registered trademark) communication method.

13. The communication apparatus according to claim 1, wherein the second communication method conforms to a communication method under an IEEE 802.11 standard.

14. A method for controlling a communication apparatus that includes: one or more processors; and a memory storing instructions which, when the instructions are executed by the one or more processors, cause the communication apparatus to function as: a first communication unit configured to communicate with an external apparatus using a first communication method in which directionality of radio waves is variable; a second communication unit configured to communicate with the external apparatus using a second communication method in which directionality of radio waves is variable, the second communication method being different from the first communication method; and a control unit, the method comprising:
controlling the first communication unit and the second communication unit so as to, after communication using the first communication method has been established, switch communication with the external apparatus to communication using the second communication method, by the control unit,
wherein, during the controlling, in a case of switching the communication with the external apparatus to the communication using the second communication method, directionality of second radio waves in the second communication method is controlled using information regarding directionality of first radio waves used in the first communication method.

15. A non-transitory computer-readable storage medium for causing a computer to function as each of the unit of the communication apparatus comprising:
a first communication unit configured to communicate with an external apparatus using a first communication method in which directionality of radio waves is variable;
a second communication unit configured to communicate with the external apparatus using a second communication method in which directionality of radio waves is variable, the second communication method being different from the first communication method; and
a control unit configured to control the first communication unit and the second communication unit so as to, after communication using the first communication method has been established, switch communication with the external apparatus to communication using the second communication method,
wherein, in a case of switching the communication with the external apparatus to the communication using the second communication method, the control unit controls directionality of second radio waves in the second communication method, using information regarding directionality of first radio waves used in the first communication method.

* * * * *